J. BOSCACCI.
RECEPTACLE.
APPLICATION FILED SEPT. 18, 1917.
1,332,099.
Patented Feb. 24, 1920.
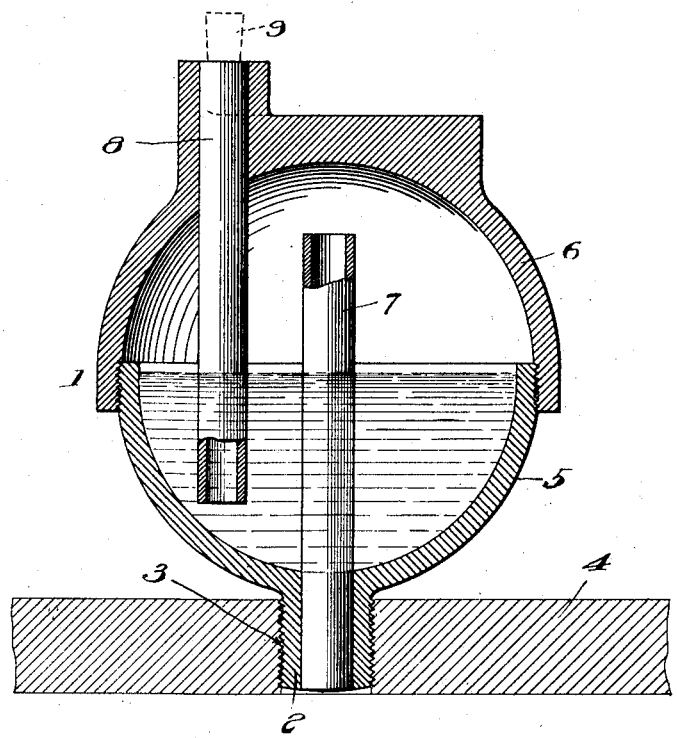
Inventor
JOSEPH BOSCACCI
By Harry C. Schroeder
Attorney

UNITED STATES PATENT OFFICE.

JOSEPH BOSCACCI, OF OAKLAND, CALIFORNIA.

RECEPTACLE.

1,332,099.  Specification of Letters Patent.  Patented Feb. 24, 1920.

Application filed September 18, 1917. Serial No. 191,948.

*To all whom it may concern:*

Be it known that I, JOSEPH BOSCACCI, a citizen of the United States, residing at Oakland, in the county of Alameda and State of California, have invented certain new and useful Improvements in Receptacles, of which the following is a specification.

This invention is a wine protector for preventing wine in a cask from souring.

The invention is illustrated in the accompanying drawing which forms part of this specification and the appended claim.

The figure in the drawing is a sectional view of the invention applied to a wine cask.

In the drawing 1 indicates a receptacle preferably spherical in shape and formed with a threaded nipple 2 adapted to screw into the bunghole 3 of a wine cask 4. The receptacle is preferably made in two semi-spherical sections, a lower section 5 and an upper section 6, which upper section screws onto the lower section. A tube 7 extends through and fits tightly in the nipple 2 and extends into the upper part of the receptacle. A tube 8 extends downwardly through the top of the upper section 6 of the receptacle into the lower part of the receptacle for admitting air from the atmosphere into a fluid in the receptacle when the upper end of the tube is uncorked. A cork 9 normally closes the upper end of the tube. The fluid used in the receptacle is preferably alcohol but other chemically equivalent liquids may be used if desired.

When the wine is drawn from the cask the cork 9 is removed from the tube 8 and air passes from the atmosphere through the tube into the alcohol in the receptacle and is impregnated with the fumes of the alcohol and then passes through the tube 7 into the cask 4 where it serves the usual function of establishing pressure on the top of the wine for forcing the wine out of the cask faucet. The air impregnated with the fumes of the alcohol is removed of its souring effect and therefore serves its usual function without souring the wine.

Having described my invention I claim as new and desire to secure by Letters Patent:

A device of the character disclosed including a spherical receptacle formed in two semi-spherical sections, the upper section screwing onto the lower section, a nipple on the lower section, a tube extending through said nipple and above the upper edge of said lower section, a tube extending through said upper section below the lower edge of said section, and a closure for the outer end of said latter tube.

In testimony whereof I affix my signature.

JOSEPH BOSCACCI.